US008345024B2

(12) United States Patent
Yamada

(10) Patent No.: US 8,345,024 B2
(45) Date of Patent: Jan. 1, 2013

(54) DISPLAY SYSTEM, DISPLAY DEVICE, AND METHOD FOR THE SAME

(75) Inventor: Toshimichi Yamada, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 1327 days.

(21) Appl. No.: 12/075,879

(22) Filed: Mar. 15, 2008

(65) Prior Publication Data

US 2008/0238899 A1 Oct. 2, 2008

(30) Foreign Application Priority Data

Mar. 29, 2007 (JP) ................................ 2007-086778

(51) Int. Cl.
*G06F 3/038* (2006.01)

(52) U.S. Cl. ............ 345/204; 345/30; 345/82; 345/107

(58) Field of Classification Search ........................ None
See application file for complete search history.

(56) References Cited

U.S. PATENT DOCUMENTS 5,410,326 A * 4/1995 Goldstein ..................... 348/734
6,225,984 B1 * 5/2001 Crawford ...................... 345/173
2002/0036616 A1 * 3/2002 Inoue ........................... 345/107
2003/0210236 A1 * 11/2003 Martin et al. ................. 345/173
2005/0001812 A1 * 1/2005 Amundson et al. ........... 345/107

FOREIGN PATENT DOCUMENTS

JP 2002-116733 A 4/2002

* cited by examiner

*Primary Examiner* — Sumati Lefkowitz
*Assistant Examiner* — Jesus Hernandez
(74) *Attorney, Agent, or Firm* — AdvantEdge Law Group, LLC

(57) ABSTRACT

A display system includes a display device with a display section. A display-data providing device provides a display control signal containing display data to the display device. The display-data providing device stores display data to be provided to the display device and information corresponding to the display data in association with each other. The display device holds the corresponding information associated with the display data provided from the display-data providing device. If the display data is lost from the display device, and if the display-data providing device identifies the display content indicated by the corresponding information contained in the display-data identifying signal output by the display device, the display device erases the display content according to a second inverted erase signal sent from the display-data providing device, and the second inverted erase signal includes the display data corresponding to the display content identified by the display-data providing device.

12 Claims, 5 Drawing Sheets

DISPLAY SYSTEM, DISPLAY DEVICE, AND METHOD FOR THE SAME

BACKGROUND

1. Technical Field

The present invention relates to a display system having a display device that uses an electrophoretic phenomenon and a display method for the display device and the display system.

2. Related Art

Some of conventional nonluminescent display devices use an electrophoretic phenomenon (for example, refer to JP-A-2002-116733). Electrophoresis is a phenomenon in which when an electric field is applied to a dispersed system in which positively or negatively charged fine particles (electrophoretic particles) dispersed in liquid (dispersion medium), the electrophoretic particles migrate by Coulomb force. This display device has a display section in which a device substrate having pixel electrodes and a counter electrode having a common electrode are opposed at a specified interval, between which a dispersed system serving as pixels, a unit of image display, is disposed. The device substrate and the counter substrate are made of a transparent material. The dispersed system that constitutes pixels have, for binary representation (monochrome display), positively charged white electrophoretic particles and negatively charged black electrophoretic particles dispersed in liquid. Another example of the dispersed system contains white electrophoretic particles dispersed in liquid (dispersion medium) stained in black.

When a potential difference is applied between the pixel electrodes and the common electrode of such display devices, the electrophoretic particles are attracted from the initial position to the pixel electrodes or the common electrode by Coulomb force. At that time, if white electrophoretic particles are attracted to the transparent common electrode, light incident on the common electrode is reflected by the electrophoretic particles to allow the color (white) of the electrophoretic particles to be viewed. On the other hand, if black electrophoretic particles are attracted to the transparent common electrode, light incident on the common electrode is reflected by the electrophoretic particles to allow the color (black) of the electrophoretic particles to be viewed. In other words, these display devices are configured such that a common electrode and pixel electrodes are opposed in matrix form and the positions of the electrophoretic particles in the dispersed system between both electrodes are individually controlled so that images including characters and pictures are formed. Moreover, when power supply to the pixels is stopped, the electrophoretic particles of this display device are stopped at a position moved from the initial position, so that the display content can be held.

Such display devices are configured to erase held display content before new display content is written thereto. Methods for efficiently erasing the display content include erasing the display content by applying a potential difference opposite to that for display. However, the opposite potential difference to be applied to pixels is generated according to image data corresponding to the held display content. It is therefore necessary for the display device to have a high-capacity storage circuit capable of storing the image data corresponding to the held display content for a long period. Even with such a storage circuit, power is exhausted when the display device is carried for a long time, for example, so that the image data stored in the storage circuit is lost and therefore the display content cannot be erased efficiently.

SUMMARY

An advantage of some aspects of the invention is to provide a display system having a display device in which a dispersed system containing electrophoretic particles is disposed between a first electrode and a second electrode, wherein display content can be erased efficiently, and to provide a display method for the display device and the display system.

A display system according to a first aspect of the invention includes: a display device including a display section having a dispersed system containing electrophoretic particles between a first electrode and a second electrode, wherein an electric field is generated between the first electrode and the second electrode according to display data, and the electrophoretic particles are migrated by the electric field so that an image corresponding to the display data is displayed; and a display-data providing device that provides a display control signal containing the display data to the display device; wherein the display system erases the display content of the display section by generating an electric field between the first electrode and the second electrode according to display data corresponding to the display content. The display-data providing device stores display data to be provided to the display device and information corresponding to the display data in association with each other. The display device holds the corresponding information associated with the display data provided from the display-data providing device, wherein if the display data is lost, the display device outputs a display-data identifying signal containing the corresponding information, and erases the display content according to display data corresponding to the display content identified by the display-data providing device according to the corresponding information contained in the display-data identifying signal.

The display system of this structure can specify display data corresponding to the display content of the display device from the display data stored in the display-data providing device according to the corresponding information contained in the display-data identifying signal, and erase the display content according to the display data. Accordingly, the display content can be erased efficiently even if the display data of the display device is lost.

Preferably, in the display system, the display-data providing device stores the display data and the corresponding information unique to the display data in association with each other, and provides the display control signal containing the corresponding information to the display device; and the display device includes a nonvolatile memory for storing the corresponding information contained in the display control signal, and outputs a display-data identifying signal containing the corresponding information stored in the nonvolatile memory.

This structure allows the display system to specify display data corresponding to the display content of the display device according to the corresponding information unique to the display data stored in the nonvolatile memory of the display device, thus allowing the display content to be erased efficiently without the need for the display device to have a high-capacity storage circuit for storing display data corresponding to the display content.

Preferably, in the display system, the display-data providing device stores the display data and the corresponding information unique to the display device that sends the display control signal containing the display data in association with each other; and the display device outputs the display-data identifying signal containing the corresponding information.

This structure allows the display system to specify display data corresponding to the display content of the display device according to the corresponding information unique to the display device, thus allowing the display content to be erased efficiently without the need for the display device to have a storage section for storing display data corresponding to the display content.

Preferably, in the display system, the display-data providing device determines whether or not display data can be identified according to the display-data identifying signal is possible, wherein if no display data is identified according to the display-data identifying signal, the display device alternately generates opposite electric fields between the first electrode and the second electrode to erase the display content.

This structure allows the display system to surely erase display content even if no display data is identified according to corresponding information.

Preferably, in the display system, the display-data providing device sends the display control signal by radio; and the display device includes a power generating section that generates power for generating an electric field between the first electrode and the second electrode from the display control signal sent by radio.

This structure eliminates the need for a power supply, thus offering a high-portability display device.

Preferably, in the display system, the display device includes a storage section that stores the display data while power is supplied from the power generating section.

With this structure, the display system can erase display content efficiently according to the display data held in the display device while power is continuously supplied from the power generating section.

Preferably, in the display system, the display-data providing device erases the display content before an image according to new display data is displayed.

This structure allows the display system to surely erase display content before an image according to new display data is displayed, thus allowing a high-quality image according to new display data to be displayed.

A display device according to a second aspect of the invention includes a display section having a dispersed system containing electrophoretic particles between a first electrode and a second electrode. The display device generates an electric field between the first electrode and the second electrode according to a display control signal containing display data sent from a display-data providing device, migrates the electrophoretic particles by the electric field to display an image corresponding to the display data, and generates an electric field between the first electrode and the second electrode according to display data corresponding to the display content of the display section to erase the display content. The display data contained in the display control signal is stored in the display-data providing device in association with information corresponding to the display data. The display device holds the corresponding information associated with the display data provided from the display-data providing device, wherein if the display data is lost, the display device outputs a display-data identifying signal containing the corresponding information, and erases the display content according to display data corresponding to the display content identified by the display-data providing device according to the corresponding information contained in the display-data identifying signal.

With this structure, the display system can identify display data corresponding to the display content of the display device from the display data stored in the display-data providing device according to the corresponding information contained in the display-data identifying signal, and erase the display content according to the display data. Thus, even if the display data of the display device is lost, the display content can be erased efficiently.

A display method according to a third aspect of the invention is for a display system including a display device including a display section having a dispersed system containing electrophoretic particles between a first electrode and a second electrode, wherein an electric field is generated between the first electrode and the second electrode according to display data, and the electrophoretic particles are migrated by the electric field so that an image corresponding to the display data is displayed; and a display-data providing device that provides a display control signal containing the display data to the display device, wherein the display system erases the display content of the display section by generating an electric field between the first electrode and the second electrode according to display data corresponding to the display content and then displays an image according to new display data. The method includes: for the display-data providing device, storing display data to be provided to the display device and information corresponding to the display data in association with each other; and for the display device, holding the corresponding information associated with the display data provided from the display-data providing device, wherein if the display data is lost, outputting a display-data identifying signal containing the corresponding information, and erasing the display content according to display data corresponding to the display content identified by the display-data providing device according to the corresponding information contained in the display-data identifying signal.

With this structure, the display system can specify display data corresponding to the display content of the display device from the display data stored in the display-data providing device according to the corresponding information contained in the display-data identifying signal, and erase the display content according to the display data. Thus, even if the display data of the display device is lost, the display content can be erased efficiently.

BRIEF DESCRIPTION OF THE DRAWINGS

The invention will be described with reference to the accompanying drawings, wherein like numbers reference like elements.

Figure 4:
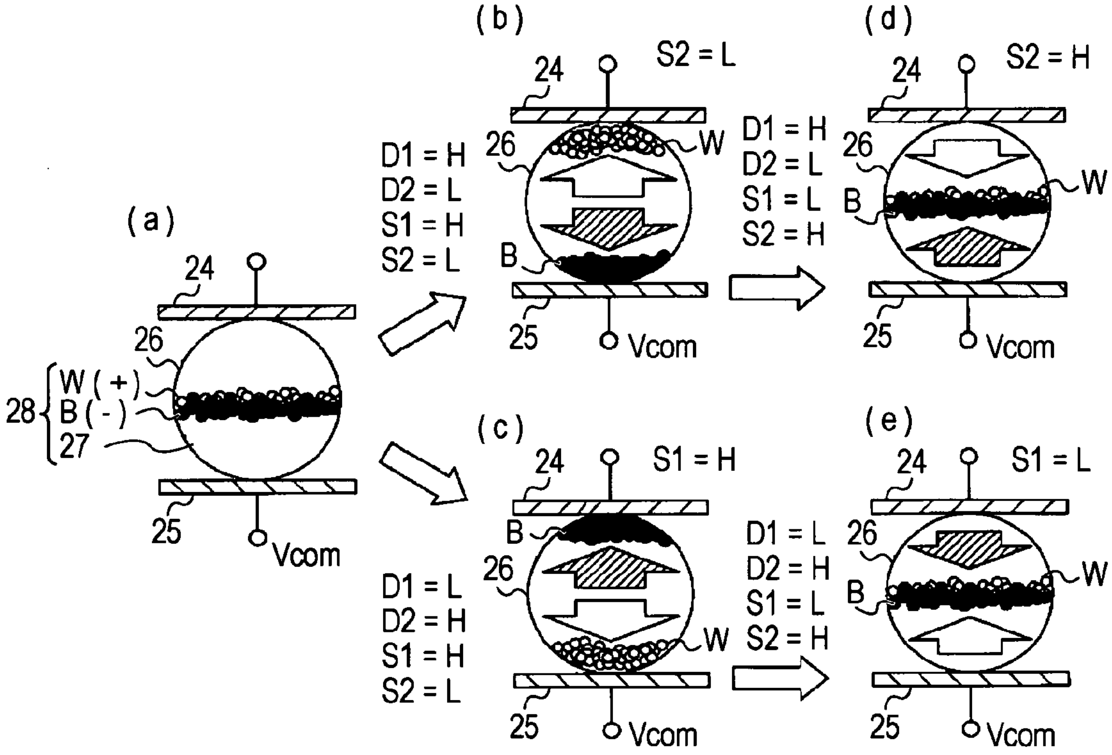

Parts (a) to (e) of FIG. 4 illustrate the operation of a display section.

Figure 5:
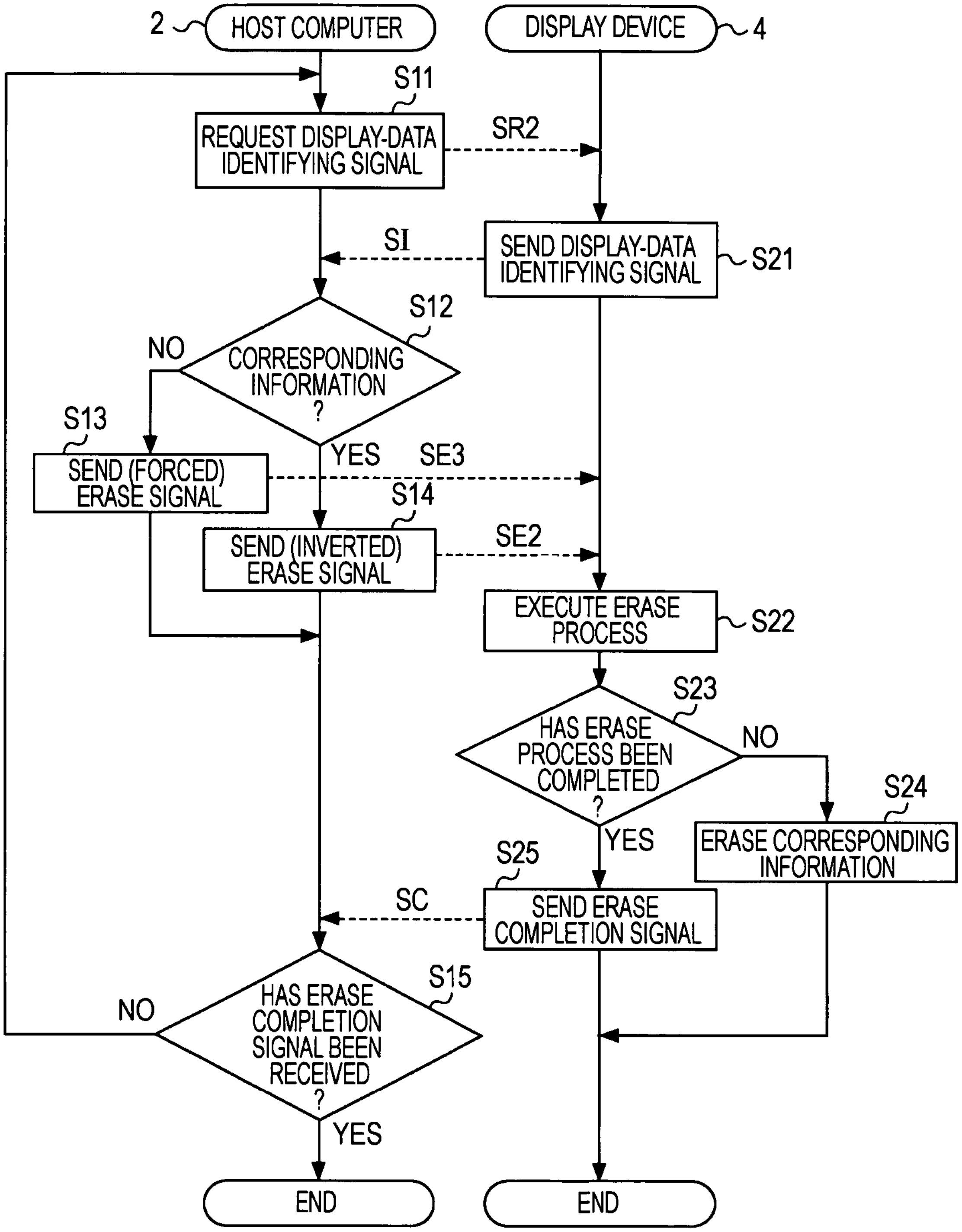

FIG. 5 is a flowchart for a display-data identifying and erasing process.

DESCRIPTION OF EXEMPLARY EMBODIMENTS

An embodiment of the invention will be described hereinbelow with reference to the drawings.

Figure 1:
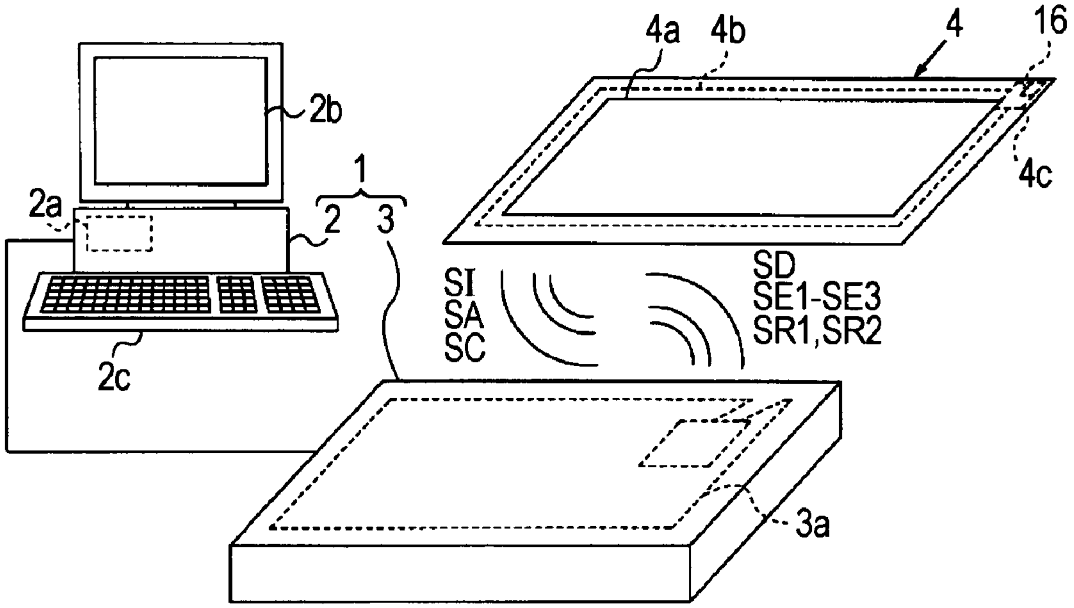
FIG. 1 is a schematic diagram of a display system according to an embodiment of the invention.

Referring to FIG. 1, the display system of this embodiment provides display date such as image data to a display device 4 via a writing device 3 (antenna 3*a*) connected to a host computer 2 that constitutes a display-data providing unit 1 to display an image corresponding to the display data.

The host computer 2 includes a CPU, a RAM, and a ROM and stores display data to be displayed on the display device 4 in a display-data storage section 2*a*. The display-data storage section 2*a* stores display data and information corresponding to the display data (ID information unique to the display data) in association with each other. The host computer 2 selectively displays an image corresponding to display data on a display screen 2*b* such as a liquid crystal display. The host computer 2 then generates a display control signal SD containing display data corresponding to an image selected by the operation of an operation device 2*c* such as a keyboard and information corresponding to the display data, and outputs the display control signal SD to the writing device 3 that constitutes the display-data providing unit 1. The writing device 3 includes an antenna 3*a*. The host computer 2 provides the display control signal SD containing display data to the display device 4 via the writing device 3 by radio.

The display device 4 includes a rectangular display section 4*a* formed on a rectangular-plate-like device substrate. Around the display section 4*a* is provided an antenna 4*b*. The antenna 4*b* receives various control signals (the display control signal SD, a first inverted erase signal SE1, a second inverted erase signal SE2, and a forced erase signal SE3) and request signals (an acknowledgement request signal SR1 and a corresponding-information request signal SR2) sent from the host computer 2 (writing device 3), and inputs the signals to a control section 4*c* formed around the display section 4*a* on the device substrate. The antenna 4*b* sends a display-data identification signal SI, an acknowledgement signal SA, and an erase completion signal SC output from the control section 4*c* to the host computer 2 by radio.

Figure 2:
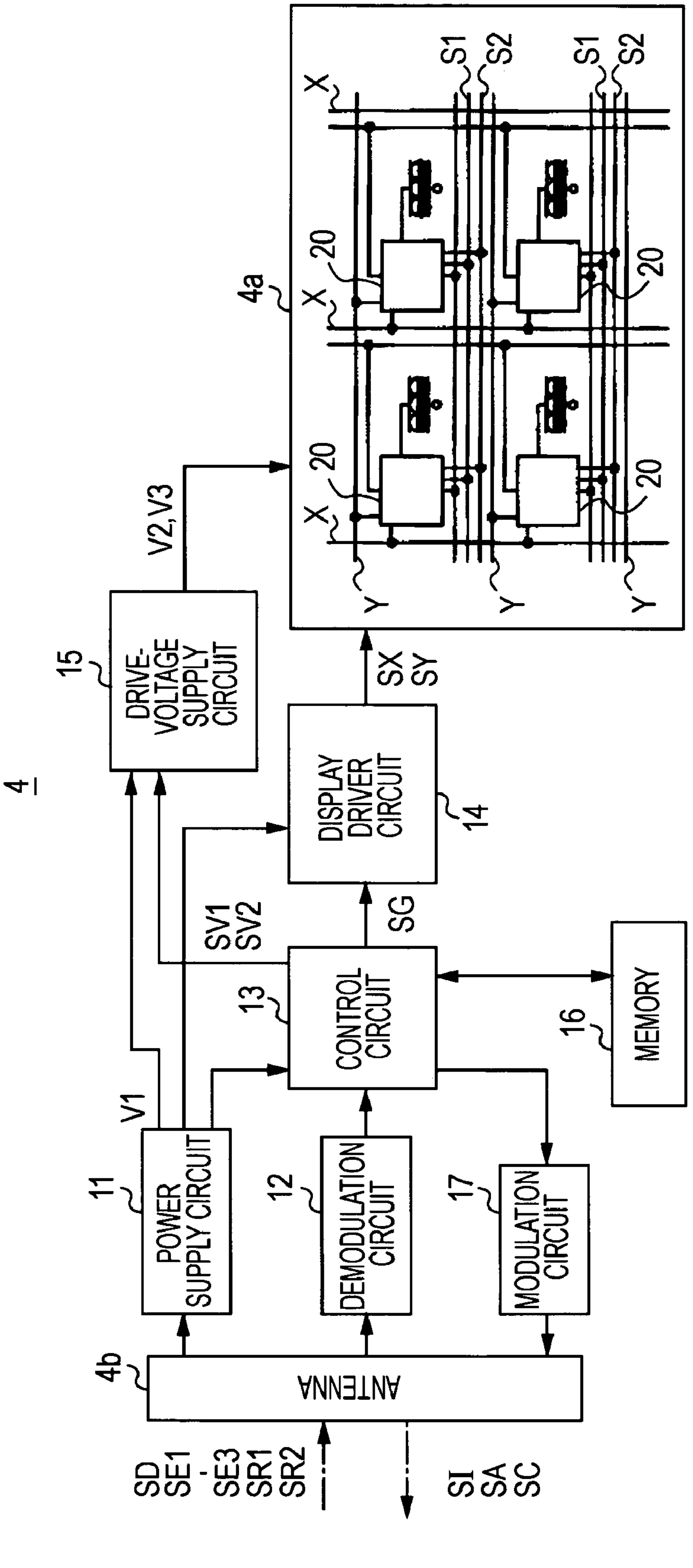
FIG. 2 is a block diagram showing the electrical structure of a display device of the embodiment.

Referring to FIG. 2, the control signals SD and SE1 to SE3 and the request signals SR1 and SR2 received by the antenna 4*b* are input to a power circuit 11 serving as the power generating section of the control section 4*c* and a demodulation circuit 12. The power circuit 11 includes a rectifier circuit and a smoothing circuit. The power circuit 11 generates a supply voltage V1 from the control signals SD and SE1 to SE3 and the request signals SR1 and SR2 which are input from the host computer 2, and outputs the supply voltage V1 to a control circuit 13, a display driver circuit (hereinafter, referred to as a driver circuit) 14, and a drive-voltage supply circuit 15. The demodulation circuit 12 demodulates the input control signals SD and SE1 to SE3 and request signals SR1 and SR2 and outputs them to the control circuit 13.

The control circuit 13 includes a CPU, a RAM, and a ROM, and generates and outputs an image-data providing signal SG, a writing-voltage supply signal SV1, and a drive-voltage supply signal SV2 for displaying an image corresponding to display data or erasing a displayed image (display content). The display system of this embodiment erases display content before displaying an image according to new display data. The control circuit 13 stores corresponding information contained in the display control signal SD sent from the host computer 2 into a nonvolatile memory (hereinafter, referred to as a memory) 16. The memory 16 can rewrite the corresponding information. The control circuit 13 generates the display-data identification signal SI containing the corresponding information stored in the memory 16 in response to the corresponding-information request signal SR2 sent from the host computer 2, and outputs it to a modulation circuit 17. The control circuit 13 also outputs the acknowledgement signal SA in response to the acknowledgement request signal SR1 sent from the host computer 2. The control circuit 13 also outputs the erase completion signal SC when erasing of display content according to various erase signals (the first inverted erase signal SE1, the second inverted erase signal SE2, and the forced erase signal SE3) is completed. The modulation circuit 17 modulates the display-data identification signal SI, the acknowledgement signal SA, and the erase completion signal SC output from the control circuit 13, and sends them to the host computer 2 via the antenna 4*b*.

The driver circuit 14 outputs a scanning-line signal SY and a data-line signal SX to the display section 4*a* according to the image-data providing signal SG output from the control circuit 13. The drive-voltage supply circuit 15 steps up or down the supply voltage V1 output from the power circuit 11 to supply a writing voltage V2 and a drive voltage V3 for driving the display section 4*a*.

The display section 4*a* has a plurality of parallel scanning lines Y along the line writing direction and a plurality of parallel data lines X transversely. At the intersections of the scanning lines Y and the data lines X, pixel circuits 20 are arranged in matrix form. The pixel circuits 20 connect to the longitudinal data lines X and the transverse scanning lines Y therebetween. The pixel circuits 20 also connect to a plurality of longitudinal first supply system lines S1 and second supply system lines S2, respectively.

Figure 3:
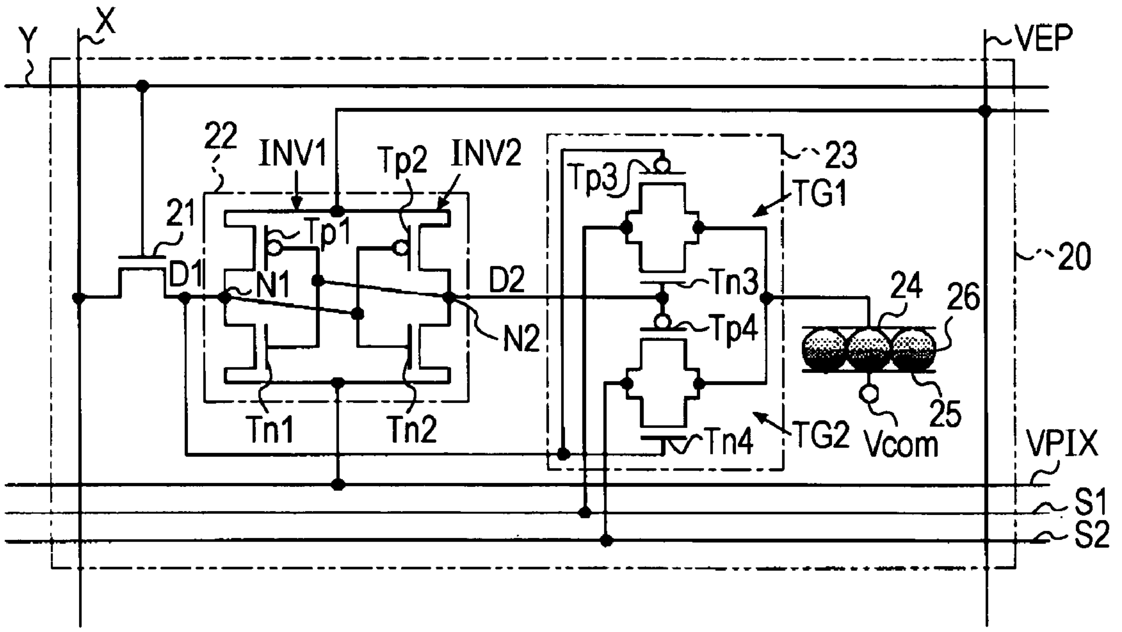
FIG. 3 is a pixel circuit diagram.

Referring to FIG. 3, each of the pixel circuits 20 has a switching transistor 21, a latch circuit 22 serving as a storage section, and a selecting circuit 23, and connects to a pixel electrode 24 serving as a first electrode. The switching transistor 21, the latch circuit 22, and the selecting circuit 23 are each formed of a thin film transistor (TFT).

The switching transistor 21 is an N-channel MOS transistor, whose gate electrode connects to the scanning line Y, and whose source electrode connects to the data line X. The drain electrode of the switching transistor 21 connects to the latch circuit 22 and the selecting circuit 23. Accordingly, the switching transistor 21 is brought into conduction according to the scanning-line signal SY from the driver circuit 14 to input a low-level or high-level pixel-data signal D1 according to the data-line signal SX to the latch circuit 22 and the selecting circuit 23.

The latch circuit 22 is constituted by two inverter circuits INV1 and INV2 connected in ring shape. The first inverter circuit INV1 includes a P-channel MOS transistor Tp1 and an N-channel MOS transistor Tn1 connected in series between a first writing supply line VEP and a second writing supply line VPIX. The second inverter circuit INV2 includes a P-channel MOS transistor Tp2 and an N-channel MOS transistor Tn2 connected in series between the first writing supply line VEP and the second writing supply line VPIX. The node N1 between the transistors Tp1 and Tn1 which constitute the first inverter circuit INV1 connects to the gates of the transistors Tp2 and Tn2 which constitute the second inverter circuit INV2. The node N2 between the transistors Tp2 and Tn2 which constitute the second inverter circuit INV2 connects to the gates of the transistors Tp1 and Tn1 which constitute the first inverter circuit INV1. The node N1 between the transistors Tp1 and Tn1 which constitute the first inverter circuit INV1 connects also to the drain electrode of the switching transistor 21. The node N2 between the transistors Tp2 and Tn2 which constitute the second inverter circuit INV2 connects also to the selecting circuit 23. In the display system of the embodiment, the host computer 2 always outputs the acknowledgement request signal SR1 to the display device 4; and the display device 4 always supplies the power that the power circuit 11 generates according to the acknowledgement request signal SR1 to the first writing supply line VEP and the second writing supply line VPIX. Accordingly, the latch circuit 22 holds the pixel-data signal D1 corresponding to the display content input to the pixel circuit 20 and inputs a selection signal D2 which is inverted in level from the pixel-data signal D1 to the selecting circuit 23 while the communication with the host computer 2 continues after the pixel-data signal D1 is input.

The selecting circuit 23 includes two transmission gates TG1 and TG2. The first transmission gate TG1 is constituted by a P-channel MOS transistor Tp3 and an N-channel MOS transistor Tn3 connected in parallel between the first supply system line S1 and the pixel electrode 24. The gate of the P-channel MOS transistor Tp3 that constitutes the first transmission gate TG1 connects to the drain electrode of the switching transistor 21. The gate of the N-channel MOS transistor Tn3 connects to the node N2 between the transistors Tp2 and Tn2 that constitute the second inverter circuit INV2. The second transmission gate TG2 is constituted by a P-channel MOS transistor Tp4 and an N-channel MOS transistor Tn4 connected in parallel between the second supply system line S2 and the pixel electrode 24. The gate of the P-channel MOS transistor Tp4 that constitutes the second transmission gate TG2 connects to the node N2 between the transistors Tp2 and Tn2 that constitute the second inverter circuit INV2. The gate of the N-channel MOS transistor Tn4 connects to the drain electrode of the switching transistor 21. Accordingly, when the first writing supply line VEP rises to the writing voltage V2, the selecting circuit 23 brings the first transmission gate TG1 or the second transmission gate TG2 selected according to a selection signal D2 into conduction.

The pixel electrodes 24 are disposed at regular intervals opposite to a common electrode 25, serving as a second electrode, formed on the transparent counter substrate opposed to the device substrate. Between the pixel electrodes 24 and the common electrode 25 spread microcapsules 26. As shown in part (a) of FIG. 4, each of the microcapsules 26 is filled with a dispersed system 28 containing white and black electrophoretic particles W and B and liquid 27. The white electrophoretic particles W are positively charged, while the black electrophoretic particles B are negatively charged. The specific gravities of the electrophoretic particles W and B are set substantially equal to that of the liquid 27 so as to prevent settling due to weight.

The control circuit 13 outputs the image-data providing signal SG to input a pixel-data signal D1 according to the display data contained in the display control signal SD to the pixel circuit 20. The control circuit 13 then outputs the writing-voltage supply signal SV1 to supply the writing voltage V2 to the first writing supply line VEP. The control circuit 13 next outputs the drive-voltage supply signal SV2 to supply a high-level drive voltage V3 to the first supply system line S1 and a low-level drive voltage V3 to the second supply system line S2, respectively. Thus, the pixel electrodes 24 are supplied with the high-level or low-level drive voltage V3. On the other hand, the common electrode 25 of the counter substrate is provided with a common electrode voltage Vcom from the power circuit 11. Thus, a potential difference is generated between the pixel electrodes 24 and the common electrode 25 to cause migration of the electrophoretic particles W and B in the microcapsules 26 disposed between the pixel electrodes 24 and the common electrode 25, so that a gray level according to the pixel-data signal D1 is provided in each pixel.

Specifically, the pixel circuit 20 that has received a high-level pixel-data signal D1 holds the high-level pixel-data signal D1. When the first writing supply line VEP rises to the writing voltage V2 so that a low-level selection signal D2 is input to the selecting circuit 23, both the transistors Tp3 and Tn3 that constitute the first transmission gate TG1 are turned off and both the transistors Tp4 and Tn4 that constitute the second transmission gate TG2 are turned on. When the drive voltage V3 is applied to the first supply system line S1 and the second supply system line S2, a low-level drive voltage V3 is supplied to the pixel electrodes 24 via the pixel circuit 20, so that the black electrophoretic particles B migrate to the common electrode 25 (see part (b) of FIG. 4). On the other hand, the pixel circuit 20 that has received a low-level pixel-data signal D1 holds the low-level pixel-data signal D1. When the first writing supply line VEP rises to the writing voltage V2 so that a high-level selection signal D2 is input to the selecting circuit 23, both the transistors Tp3 and Tn3 that constitute the first transmission gate TG1 are turned on and both the transistors Tp4 and Tn4 that constitute the second transmission gate TG2 are turned off. When the drive voltage V3 is applied to the first supply system line S1 and the second supply system line S2, a high-level drive voltage V3 is supplied to the pixel electrodes 24 via the pixel circuit 20, so that the white electrophoretic particles H migrates to the common electrode 25 (see part (c) of FIG. 4). Thus, an image is displayed on the display device 4.

The display device 4 of this embodiment is configured such that the pixel circuits 20 each hold display data (the pixel-data signal D1) corresponding to display content, as described above. To erase the display content of the display device 4, the host computer 2 first determines whether the display data (the pixel-data signal D1) corresponding to the display content held in the display device 4 has been lost, and determines whether to erase the display content according to the display data (the pixel-data signal D1) held in the display device 4 from the determination result.

Specifically, the host computer 2 of the embodiment always outputs the acknowledgement request signal SR1 for requiring the display device 4 to output the acknowledgement signal SA to monitor the state of communication with the display device 4. The display device 4 generates power from the acknowledgement request signal SR1 which is always sent from the host computer 2, and holds display data (the pixel-data signal D1) corresponding to the display content input to each pixel circuit 20. The host computer 2 determines whether the display data (the pixel-data signal D1) held in each of the pixel circuits 20 of the display device 4 has been lost according to whether the communication with the display device 4 continues.

More specifically, the RAM of the host computer 2 has a flag-data storage area that stores flag data for determining whether the communication between the host computer 2 and the display device 4 continues. If the host computer 2 has not received the acknowledgement signal SA responding to the acknowledgement request signal SR1, the host computer 2 determines that the communication with the display device 4 has been shut off and sets the flag data to “1”. If new data is written to the display device 4, the host computer 2 resets the flag data (to “0”).

Before erasing the display content of the display device 4, the host computer 2 first determines whether the display data (the pixel-data signal D1) held in each pixel circuit 20 of the display device 4 has been lost. Specifically, if the flag data is “0”, the host computer 2 determines that the display data (the pixel-data signal D1) has not been lost; if the flag data is “1”, the host computer 2 determines that the display data (the pixel-data signal D1) has been lost.

If it is determined that the display data (the pixel-data signal D1) has not been lost, the host computer 2 outputs a first inverted erase signal SE1 to erase the display content using the display data (the pixel-data signal D1) held in the display device 4. When the first inverted erase signal SE1 is sent from the host computer 2, the control circuit 13 supplies s low-level drive voltage V3 to the first supply system line S1, and a high-level drive voltage V3 to the second supply system line S2 to apply a potential difference opposite to that of display. Thus, the pixel electrodes 24 are supplied with a high-level drive voltage V3 via the pixel circuit 20 that has received the high-level pixel-data signal D1, so that the electrophoretic particles W and B migrate to the initial position (see part (4) of FIG. 4). The pixel electrodes 24 are supplied with a low-level drive voltage V3 via the pixel circuit 20 that has received the low-level pixel-data signal D1, so that the electrophoretic particles W and B migrate to the initial position (see part (e) of FIG. 4). Thus, the display content in the display device 4 is erased efficiently.

In contrast, if it is determined that the display data (the pixel-data signal D1) has been lost, the host computer 2 identifies display data corresponding to the display content of the display device 4 from the display data stored in the display-data storage section 2*a*, and executes a display-data identifying and erasing process according to the identified display data.

The display-data identifying and erasing process of the display system will be described with reference to the flowchart of FIG. 5.

As described above, the host computer 2 of the embodiment stores display data to be provided to the display device 4 and corresponding information unique to the display data in association with each other, and outputs the display control signal SD containing the corresponding information to the display device 4. The control circuit 13 of the display device 4 displays an image according to the display data and stores the corresponding information contained in the display control signal SD into the memory 16.

In the display-data identifying and erasing process, in step S11, the host computer 2 sends the corresponding-information request signal SR2 to require output of the display-data identification signal SI to the display device 4. In step S21, the display device 4 that has received the corresponding-information request signal SR2 reads the corresponding information stored in the memory 16, and sends the display-data identification signal SI containing the corresponding information to the host computer 2.

In step S12, the host computer 2 that has received the display-data identification signal SI determines whether display data corresponding to the display content of the display device 4 can be identified according to the corresponding information contained in the display-data identification signal SI. If it is determined in step S12 that no display data associated with the corresponding information is stored, the host computer 2 determines that no display data is identified according to the display-data identification signal SI, and moves to the step S13, wherein the host computer 2 outputs the forced erase signal SE3. If it is determined in step S12 that the display data associated with the corresponding information is stored, the host computer 2 determines that display data is identified according to the display-data identification signal SI, and moves to the step S14, wherein the host computer 2 identifies display data corresponding to the display content of the display device 4 according to the corresponding information contained in the display-data identification signal SI. The host computer 2 then outputs the second inverted erase signal SE2 containing the identified display data. In step S22, the display device 4 that has received the second inverted erase signal SE2 containing the display data or the forced erase signal SE3 executes an erasing process corresponding to the erase signal.

Specifically, when the second inverted erase signal SE2 containing the display data corresponding to the display content is sent from the host computer 2, the control circuit 13 inputs a pixel-data signal D1 corresponding to the display content according to the display data contained in the second inverted erase signal SE2. The control circuit 13 then supplies a low-level drive voltage V3 to the first supply system line S1, and a high-level drive voltage V3 to the second supply system line S2 to apply a potential difference opposite to that of display. Thus, the pixel electrodes 24 are supplied with a high-level drive voltage V3 via the pixel circuit 20 that has received the high-level pixel-data signal D1, so that the electrophoretic particles W and B migrate to the initial position (see part (d) of FIG. 4). The pixel electrodes 24 are supplied with a low-level drive voltage V3 via the pixel circuit 20 that has received the low-level pixel-data signal D1, so that the electrophoretic particles W and B migrate to the initial position (see part (e) of FIG. 4). Thus, the display content in the display device 4 is erased according to the display data corresponding to the display content of the display device 4 which is identified by the host computer 2 according to the corresponding information contained in the display-data identification signal SI.

When the forced erase signal SE3 is sent from the host computer 2, the control circuit 13 applies an equal voltage (for example, high-level voltage) to the first supply system line S1 and the second supply system line S2 to sufficiently attract the electrophoretic particles W and B to the pixel electrodes 24 or the common electrode 25, and thereafter applies an opposite voltage (for example low-level voltage) to migrate the electrophoretic particles W and B to the initial position. Thus, the display content of the display device 4 is erased.

The display device 4 that has executed an erasing process corresponding to an erase signal in step S22 moves to step S23, wherein it is determined whether the erasing process has been completed normally. If it is determined in step S23 that the erasing process has not been completed normally, the display device 4 moves to step S24, wherein the corresponding information stored in the memory 16 is erased and the process is completed. If it is determined in step S23 that the erasing process has been completed normally, the display device 4 moves to step S25, wherein the erase completion signal SC is sent and the process is completed.

If the erase completion signal SC is received in step S15, the host computer 2 terminates the process. If no erase completion signal SC is received in step S15, the host computer 2 returns to step S11, wherein it sends the corresponding-information request signal SR2 to the display device 4. In this case, the display-data identification signal SI that the display device 4 sends in response to the corresponding-information request signal SR2 in step S21 contains no corresponding information, because the corresponding information has been erased in the preceding step S24. Therefore, the host computer 2 sends the forced erase signal SE3. The host computer 2 repeats the process until it receives the erase completion signal SC.

The advantages of the embodiment will be described.

1. The host computer 2 stores display data to be provided to the display device 4 and information corresponding to the display data in association with each other. The display device 4 holds the corresponding information associated with the display data provided from the host computer 2, and if the display data (the pixel-data signal D1) has been lost, the display device 4 outputs a display-data identification signal SI containing the corresponding information. The display device 4 erases the display content according to the display data corresponding to the display content identified by the host computer 2 according to the corresponding information contained in the display-data identification signal SI. Thus, display data corresponding to the display content of the display device 4 can be identified from the display data stored in the host computer 2 according to the corresponding information contained in the display-data identification signal SI, and thus the display content can be erased according to the display data. Thus, even if the display data of the display device 4 has been lost, the display content can be erased efficiently.

2. The host computer 2 stores display data and corresponding information unique to the display data in association with each other, and provides the display control signal SD containing the corresponding information to the display device 4. The display device 4 has the memory (nonvolatile memory) 16 for storing the corresponding information contained in the display control signal SD, and outputs the display-data identification signal SI containing the corresponding information stored in the memory 16. Thus, display data corresponding to the display content of the display device 4 can be identified according to the corresponding information unique to the display data stored in the memory 16 of the display device 4. This allows the display content to be erased efficiently without a large-capacity storage circuit for the display device 4 to store the display data corresponding to the display content.

3. The host computer 2 determines whether display data can be identified according to the display-data identification signal SI, and if no display data is identified according to the display-data identification signal SI, the host computer 2 causes the display device 4 to alternately generate opposite electric fields between the pixel electrodes 24 and the common electrode 25 to erase the display content. Thus, even if display data cannot be identified according to corresponding information, the display content can be surely erased.

4. The display device 4 has the power circuit 11 that generates power from the display control signal SD sent by radio to generate an electric field between the pixel electrodes 24 and the common electrode 25. This eliminates the need for a power supply, thus increasing the portability of the display device 4.

5. The display device 4 has the latch circuit 22 for holding display data (pixel-data signal D1) while power is supplied from the power circuit 11. Thus, the display content can be erased efficiently according to the display data (pixel-data signal D1) held in the display device 4 while power is continuously supplied from the power circuit 11.

6. The host computer 2 is configured to erase display content according to display data corresponding to the display content before displaying an image according to new display data. This allows display content to be erased before new display data is displayed, thus allowing a high quality image of new data to be displayed.

The above-described embodiment may be modified as follows.

While the display device 4 of the embodiment stores corresponding information unique to the display data contained in the display control signal SD sent from the host computer 2 in the memory 16, the invention is not limited to that provided that the corresponding information associated with display data corresponding to display content can be held. For example, the invention may have a structure in which ID information unique to the display device 4 is preset as corresponding information; display data and the ID information unique to the display device 4 that sends the display control signal SD containing the display data are stored in the host computer 2 in association with each other; and the display device 4 outputs a display-data identification signal SI containing the ID information unique to the display device 4. This structure allows identifying display data corresponding to the display content of the display device 4 according to the ID information unique to the display device 4, thus allowing efficient erasing of display content without the need for the display device 4 to have a storage circuit for storing the display data corresponding to the display content.

While the host computer 2 of the embodiment sends the display control signal SD containing display data to the display device 4 by radio, the invention is not limited to that provided that the display control signal SD containing display data can be sent to the display device 4. For example, the invention may have a structure in which the display-data providing unit 1 and the display device 4 are connected together by a cable or the like, via which the display control signal SD may be sent. In this case, power for generating an electric field between the pixel electrodes 24 and the common electrode 25 may be supplied from the display-data providing unit 1 to the display device 4 via the cable.

While the embodiment has the latch circuit 22 for holding the pixel-data signal D1 input to each pixel circuit 20 as a storage section for storing display data, the invention may have a storage circuit that stores display data itself, or alternatively, the storage section disposed in the display device 4 may be omitted. While the pixel circuits 20 of the embodiment each have the selecting circuit 23, it may be omitted.

While the display-data providing unit 1 of the embodiment includes the host computer 2 and the writing device 3, the host computer 2 may be omitted. In this case, the display content of the display device 4 is managed by the writing device 3.

While the embodiment is configured such that the host computer 2 determines whether display data (pixel-data signal D1) has been lost according to stored flag data, the invention is not limited to that. For example, the invention may have a structure in which the display device 4 outputs a communication recovery signal indicative of the recovery of communication every time the communication between the host computer 2 and the display device 4 is resumed, and a determination is made whether display data (pixel-data signal D1) has been lost according to the communication recovery signal. While the embodiment is configured such that the host computer 2 determines whether display data (pixel-data signal D1) has been lost, the display device 4 may determine whether display data (pixel-data signal D1) has been lost.

While the embodiment is configured to always send the acknowledgement request signal SR1 for the display device 4 to generate power, the power circuit 11 of the display device 4 may have an auxiliary power supply (a capacitor etc.) for regular transmission.

While the host computer 2 of the embodiment outputs display data corresponding to the display-data identification signal SI, the host computer 2 may generate and output display data for inputting an inverted pixel data signal that is inverted from the pixel-data signal D1 to each pixel circuit 20. In this case, a driving voltage V3 equal to the drive voltage V3 applied for display is applied to the first supply system line S1 and the second supply system line S2, respectively.

While the display device 4 of the embodiment includes the display section 4*a* having the microcapsules 26 containing the electrophoretic particles W and B, the invention may include a display device having a display section in which liquid (dispersion medium) containing dispersed electrophoretic particles W and B is filled in the space surrounded by a partition. While the embodiment uses white and black electrophoretic particles W and B, the invention may use white electrophoretic particles dispersed in liquid stained in black, for example. The invention may also be applied to a color display device.

The host computer 2 of the embodiment may be configured to manage the display contents of two or more display devices 4.

While the embodiment is configured such that it is determined whether display data (pixel-data signal D1) has been lost before the display-data identification signal SI is required, the invention is not limited to that. For example, it may be determined whether display data (pixel-data signal D1) has been lost after the display-data identification signal SI is required. In this case, if display data (pixel-data signal D1) has not been lost, a normal inverted erasing process is executed, and if lost, a forced erasing process is executed.

What is claimed is:

1. A display system comprising:

a display device including a display section having a dispersed system containing electrophoretic particles between a first electrode and a second electrode, wherein an electric field is generated between the first electrode and the second electrode according to display data, and the electrophoretic particles are migrated by the electric field so that an image corresponding to the display data is displayed; and a display-data providing device that provides a display control signal containing the display data to the display device, wherein the display system erases display content of the display section by generating an electric field between the first electrode and the second electrode according to display data corresponding to the display content;

the display-data providing device stores display data to be provided to the display device and information corresponding to the display data in association with each other; and the display device holds the corresponding information associated with the display data provided from the display-data providing device, wherein:

if the display data is not lost from the display device, the display device erases the display content according to a first inverted erase signal by use of the display data in the display device, and the first inverted erase signal is sent from the display-data providing device, and if the display data is lost from the display device, and if the display-data providing device identifies the display content indicated by the corresponding information contained in the display-data identifying signal output by the display device, the display device erases the display content according to a second inverted erase signal sent from the display-data providing device, and the second inverted erase signal includes the display data corresponding to the display content identified by the display-data providing device.

2. The display system according to claim 1, wherein the display-data providing device stores the display data and the corresponding information unique to the display data in association with each other, and provides the display control signal containing the corresponding information to the display device; and the display device includes a nonvolatile memory for storing the corresponding information contained in the display control signal, and outputs a display-data identifying signal containing the corresponding information stored in the nonvolatile memory.

3. The display system according to claim 1, wherein the display-data providing device stores the display data and the corresponding information unique to the display device that sends the display control signal containing the display data in association with each other; and the display device outputs the display-data identifying signal containing the corresponding information.

4. The display system according to claim 1, wherein the display-data providing device determines whether or not display data is identified according to the display-data identifying signal, wherein if no display data is identified according to the display-data identifying signal, the display device alternately generates opposite electric fields between the first electrode and the second electrode to erase the display content.

5. The display system according to claim 1, wherein the display-data providing device sends the display control signal by radio; and the display device includes a power generating section that generates power for generating an electric field between the first electrode and the second electrode from the display control signal sent by radio.

6. The display system according to claim 5, wherein the display device includes a storage section that stores the display data while power is supplied from the power generating section.

7. The display system according to claim 1, wherein the display content is erased before an image according to new display data is displayed.

8. A display device comprising:

a display section having a dispersed system containing electrophoretic particles between a first electrode and a second electrode, the display device generating an electric field between the first electrode and the second electrode according to a display control signal containing display data sent from a display-data providing device, migrating the electrophoretic particles by the electric field to display an image corresponding to the display data, and generating an electric field between the first electrode and the second electrode according to display data corresponding to display content of the display section to erase the display content, wherein:

the display data contained in the display control signal is stored in the display-data providing device in association with information corresponding to the display data, and the display device holds the corresponding information associated with the display data provided from the display-data providing device, wherein:

if the display data is not lost from the display device, the display device erases the display content according to a first inverted erase signal by use of the display data in the display device, and the first inverted erase signal is sent from the display-data providing device, and if the display data is lost from the display device, the display device erases the display content according to a second inverted erase signal sent from the display-data providing device, and the second inverted erase signal includes the display data corresponding to the display content identified by the display-data providing device.

9. A display method for a display system including a display device with a display section having a dispersed system containing electrophoretic particles between a first electrode and a second electrode, wherein an electric field is generated between the first electrode and the second electrode according to display data, and the electrophoretic particles are migrated by the electric field so that an image corresponding to the display data is displayed; and a display-data providing device that provides a display control signal containing the display data to the display device, wherein the display system erases display content of the display section by generating an electric field between the first electrode and the second electrode according to display data corresponding to the display content and then displays an image according to new display data, the method comprising:

for the display-data providing device, storing display data to be provided to the display device and information corresponding to the display data in association with each other; and for the display device, holding the corresponding information associated with the display data provided from the display-data providing device, wherein:

if the display data is not lost from the display device, the display device erases the display content according to a first inverted erase signal by use of the display data in the display device, and the first inverted erase signal is sent from the display-data providing device, and if the display data is lost from the display device, and if the display-data providing device identifies the display content indicated by the corresponding information contained in the display-data identifying signal output by the display device, the display device erases the display content according to a second inverted erase signal sent from the display-data providing device, and the second inverted erase signal includes the display data corresponding to the display content identified by the display-data providing device.

10. The display system according to claim 1, wherein if the display data is lost from the display device, and if the display-data providing device does not identify the display content indicated by the corresponding information contained in the display-data identifying signal output by the display device, the display device erases the display content according to a forced erase signal sent from the display-data providing device.

11. The display device according to claim 8, wherein if the display data is lost from the display device, and if the display-data providing device does not identify the display content indicated by the corresponding information contained in the display-data identifying signal output by the display device, the display device erases the display content according to a forced erase signal sent from the display-data providing device.

12. The display method according to claim 9, wherein if the display data is lost from the display device, and if the display-data providing device does not identify the display content indicated by the corresponding information contained in the display-data identifying signal output by the display device, the display device erases the display content according to a forced erase signal sent from the display-data providing device.

* * * * *